April 20, 1954     A. L. STONE     2,676,075

PISTON FOR SLUSH PUMPS

Filed Oct. 25, 1950

INVENTOR.
Albert L. Stone,
BY.

*J S McLean*
ATTORNEY.

Patented Apr. 20, 1954

2,676,075

UNITED STATES PATENT OFFICE 2,676,075

PISTON FOR SLUSH PUMPS

Albert L. Stone, Redondo Beach, Calif., assignor, by mesne assignments, to Standard Oil Development Company, Elizabeth, N. J., a corporation of Delaware Application October 25, 1950, Serial No. 192,127

5 Claims. (Cl. 309—4)

The present application is directed to a piston for a reciprocating pump handling abrasive fluid and particularly a piston for a slush pump used for circulating the drilling fluid when drilling a borehole by the rotary method.

Preferred embodiments of the present invention are shown in the accompanying drawings in which.

Figure 1:
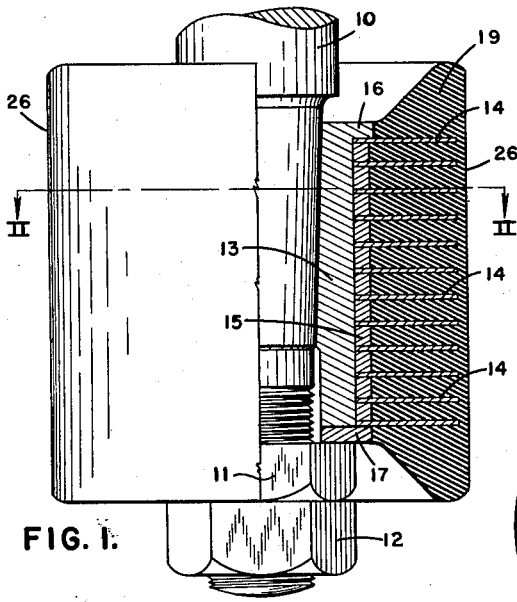
Fig. 1 is an elevation, partly in section, showing one embodiment of the present invention.
Figure 2:
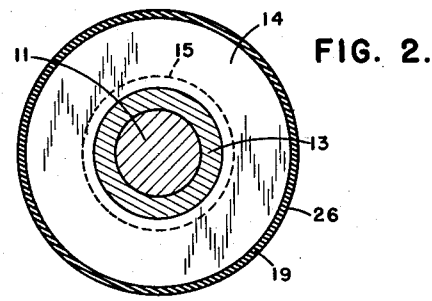
Fig. 2 is a view taken along lines II—II of Fig. 1.

Turning now specifically to the drawing and first to Figs. 1 and 2, a piston rod 10 of a reciprocating pump (not shown) and having nuts 11 and 12, has an embodiment of the piston of the present invention mounted thereon. Hub 13 of the piston is mounted on the piston rod 10 and is secured thereto by nuts 11 and 12. Flexible washers 14 are mounted concentrically on hub 13. Spacing rings 15 are placed between the washers so that they will be separated uniformly. In order to provide sufficient strength to withstand the load to which washers 14 are subjected it is preferred to attach washers 14 to hub 13 and spacing rings 15 to the hub as well as to the washers by copper brazing. The use of copper brazing permits the subsequent heat treatment of the spring members. The left-hand end of hub 13 has a shoulder 16 in contact with the end washer 14 and the righthand end of the hub has an annulus 17 copper brazed thereto. A body of rubber 19 encases and is vulcanized to the outside surface of spacing rings 15, as well as the cylindrical surface defined by shoulder 16 and ring 17 and to the annular surfaces of each flexible washer 14. This arrangement insures that rubber body 19 defines an exterior cylindrical surface which completely covers the flexible washers 14.

It has been stated that washers 14 are flexible. The advantage of such flexibility is that when fluid pressure is applied to an end of the piston (as in the normal operation of pumping drilling mud) the end washer deflects under load, so that it absorbs a minor part only of the total load and transmits the remainder (a major part of the total load) to the second washer. The second washer is identical with the end washer and similarly deflects so that it absorbs a minor portion only of the total load, and transmits the unabsorbed portion of the total load to the subsequent piston. This action is continued until all of the load has been absorbed, with a plurality of the flexible washers each absorbing an increment of the total load. As each washer distorts, it necessarily forces the portion of rubber body 19 (on the low pressure surface thereof) against the wall of the pump liner (not shown in the drawing) as a ring; accordingly, the total effect is that rubber body 19 is forced against the wall of the pump liner (not shown) in a series of rings, with each ring taking a portion of the total pressure differential to which the pump piston is subjected.

The particular advantage of the apparatus of the present invention is that the rubber external surface of the piston which makes contact with the pump liner is subjected to substantially uniform wear throughout at least a substantial part of its length because the total pressure drop is divided between a number of sections and as each section takes its pressure drop, it is forced out against the wall of the pump liner.

Figure 9:
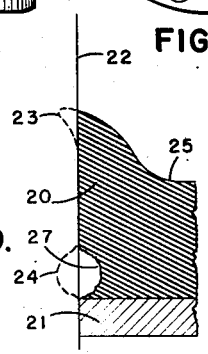
Fig. 9 is a fragmentary view illustrating a portion of a rubber piston conventional to the art.

The advantage of the device of the present invention over rubber pistons not provided with flexible washers for reinforcement is illustrated in Fig. 9 which shows the manner in which a conventional rubber piston wears. In Fig. 9 a conventional rubber piston 20 is provided with a back-up plate 21 with the outside cylindrical surface of the piston in contact with the surface of the pump liner as indicated by line 22. The dashed line 23 shows the cup end as it is molded and the dashed line 24 adjacent the back-up plate shows the position the rubber attempts to assume when pressure is being applied to the cup end. Pressure on the inside of the cup applied at surface 25 forces the rubber against the back-up plate 21 and causes it to spring out against the wall 22 of the pump liner. The result is to wear a ragged groove as shown at 27. The prior art has attempted to eliminate this action by introducing fabric between the rubber and metal back-up plate 21. This method tends to move the point of wear further away from the metal but the general effect is the same.

As heretofore explained in the device of the present invention as exemplified in Figs. 1 and 2, the flexible washers cause the pressure to be distributed along the longitudinal axis of the hub and causes the outer cylindrical surface 26 of the rubber body to wear substantially uniform rather than concentrating wear along a limited surface as in the prior art.

Figure 3:
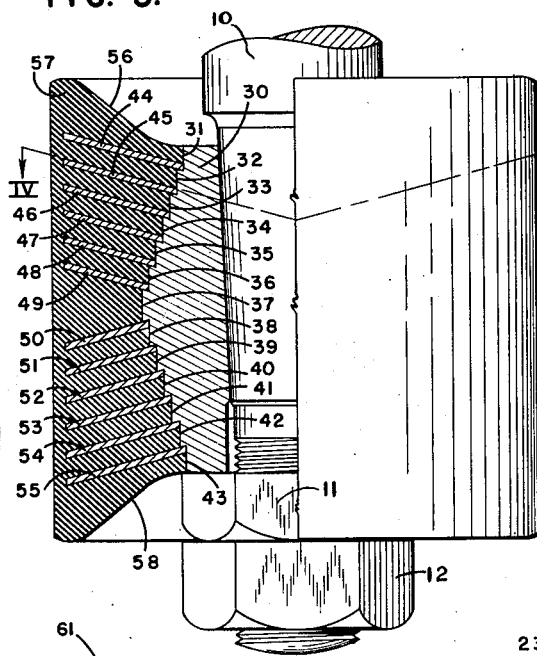
Fig. 3 is an elevation, partly in section, showing another embodiment of the present invention.

Another embodiment of the present invention is shown in Fig. 3. In this embodiment hub 30 has its exterior formed in the shape of a plurality of rings 31 to 43, said rings increasing in diameter progressively from end ring 31 to the center ring 37 and decreasing in diameter progressively from center ring 37 to end ring 43, that is, the rings are arranged stepwise from end ring 31 to center ring 37 and from end ring 43 to center ring 37. Flexible washers 44 to 55, inclusive, are mounted on hub 30. These washers are dished, that is to say their faces slant with respect to the longitudinal axis of hub 30. The washers are arranged as two series. One series, washers 44 to 49, arranged on one end of the hub, are parallel and slant in the same direction while the other series, washers 50 to 55, arranged at the other end of the hub, also are parallel but slant in the opposite direction from the first series. In this embodiment the dished flexible washers are pointed in the direction of pressure, that is to say the series of washers 44 to 49 are designed to resist the pressure exerted through surface 56 on rubber body 57 while the series of washers 50 to 55 are designed to resist the pressure exerted through surface 58 of rubber body 57. As shown in the drawing, the inner circumference of each washer bears against a step formed by the outer circumference of hub 30 so that when pressure is exerted against surface 56 the inner edges of washers 44 to 49, inclusive, bear against the steps provided by rings 32—37, inclusive, and when pressure is exerted against end 58 the inner edges of washers 50 to 55 bear against the steps provided by rings 37 to 42, inclusive.

The advantage of the embodiment of Fig. 3 is that as pressure is exerted against an end of the piston, the flexible washers mounted on that end tend to deflect toward the wall of the pump liner (not shown) insuring more positively that rubber body 57 will move outwardly and make firm contact with the liner wall. This action aids in securing more uniform wear of the outside surface of rubber body 57.

Figure 4:
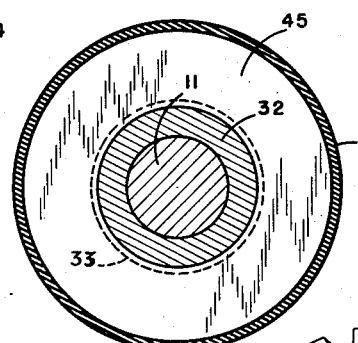
Fig. 4 is a view taken along lines IV—IV of Fig. 3.
Figure 5:
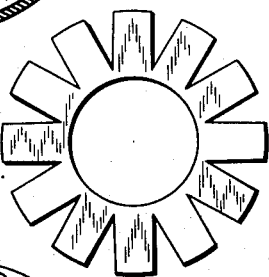
Fig. 5 is an elevation showing another form of washer which may be used in the piston of the present invention.

In the embodiments of the invention heretofore described, the spring washers have been in the shape of annuli. In Figs. 1 and 2 the faces of the washers are normal to the longitudinal axis of the hub and in Figs. 3 and 4 the faces of the washers are slanting with respect to the axis of the hub. In the embodiment of Fig. 5 a form of flexible washer is shown which is not in the shape of an annulus but instead has triangular portions cut away around its periphery so as to produce in effect a number of leaf-type springs. This type of flexible washer may be substituted for the annulus form of washers of the embodiment of Figs. 1 and 2 and that of Figs. 3 and 4.

Figure 6:
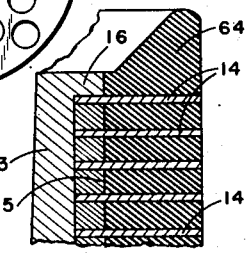
Fig. 6 is a view showing another embodiment of a washer which may be used in the piston of the present invention.

Another form of flexible washer is shown in Fig. 6. In this embodiment the washer is provided with a plurality of perforations 60. It will be understood that this washer may be formed either as annulus with straight sides or dished so that a perforated washer of this type may be substituted for washers shown in the embodiment of Figs. 1 and 2 and in the embodiment of Figs. 3 and 4. The flexible washer of Fig. 6 has an uninterrupted outside cylindrical edge as do the solid washers of the embodiments of Figs. 1 to 4 so that when using washers of this type the rubber pressure against the liner is in the form of a series of rings when pressure is applied to the end of the piston.

Figure 7:
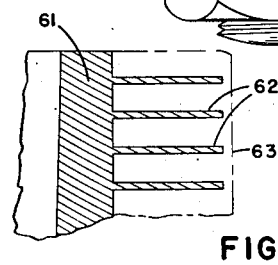
Fig. 7 is a fragmentary view showing an alternative method for securing washers to the hub in the piston of the present invention.

A further embodiment of the device of the present application is shown in Fig. 7. In this embodiment the washer members are integral with the hub. As shown in Fig. 7, the hub portion 61 has flexible washer members or fins 62 secured thereto which are spaced at uniform intervals along the hub portion 61. As in the embodiments previously described, a body of rubber 63 encases the hub and fins and is secured thereto by vulcanization so that the rubber forms the exterior cylindrical surface of the piston body.

Figure 8:
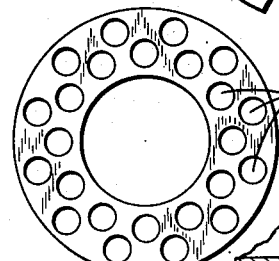
Fig. 8 is a fragmentary view showing another embodiment of the present invention.

Another embodiment of the present invention is shown in Fig. 8. This embodiment is similar to that of Fig. 1 and, accordingly, the hub 13, spacing rings 15 and spring washers 14 have been identified with numbers identical with those used for corresponding parts of Fig. 1. Similar to the embodiment of Fig. 1, a body of rubber 64 encases and is vulcanized to the outside surface of spacing rings 15, the cylindrical surfaces defined by shoulder 16 and the annular surfaces of each flexible washer 14. In the construction of the embodiment of Fig. 8 it is preferred to copper braze washers 14 and copper braze spacing rings 15 to hub 13 as well as to spring members 14 as in the embodiment of Fig. 1. The difference between the embodiment of Fig. 8 and that of Fig. 1 is that in Fig. 1 the rubber body 19 covers the outside edge of spring washers 14 whereas in the embodiment of Fig. 8 the ends of spring washers 14 are not covered with rubber but instead are exposed, the edges of spring members 14 and the rubber body 19 cooperating to form a cylindrical surface when the piston is unloaded. When the embodiment of Fig. 8 is loaded, the spring members 14 will distort and in turn will distort the rubber body to force it out against the wall of the piston.

It is desirable to prevent metal to metal contact between the metal washers of the piston and the metal wall of the cylinder in which the piston reciprocates because such metal to metal contact might cut the cylinder wall.

In the embodiments of Figs. 1, 2, 3, and 4 where the rubber covers the edge of the flexible washer members there is no possibility for the washers to come into contact with the wall of the pump as long as the rubber body remains intact. In the embodiment of Fig. 8 the distortion of the rubber when the piston is under load will force the rubber outwardly and into contact with the cylinder wall with sufficient force to prevent the rubbing of the metal parts.

While I have described specific embodiments of the device of the present invention, it will be obvious to a workman skilled in the art that various changes in the sizes, shapes and dimensions may be made without departing from the scope of the invention.

Having fully described and illustrated the present invention, what I desire to claim as new and useful and to secure by Letters Patent is:

1. A piston for a slush pump comprising, in combination, an elongated hub member adapted to be mounted on the piston rod of a slush pump, a series of spaced spring washers carried by the hub with the inner circular edge of each washer fixed to said hub and a unitary rubber body defining a cylindrical outer surface completely encasing and vulcanized to each of the said spring washers and outer surface of said hub so as to fill completely the space between said spring washers, said spring washers having such flexibility that at least a major portion of said series is deflected under the maximum pressure exerted by the slush pump when pumping fluid.

2. A device in accordance with claim 1 in which the faces of the washers of said series are flat and normal to said hub.

3. A device in accordance with claim 2 in which said washers are provided with a plurality of perforations between their inside and outside circular edges.

4. A device in accordance with claim 1 in which two series of washers are carried by the hub with the faces of the washers dished, and one series is parallel and makes an angle of less than 90° with the axis of said hub, and the other series is parallel and makes an angle greater than 90° with the axis of said hub.

5. A device in accordance with claim 4 in which said washers have a number of perforations between their inside and outside circular edges.

References Cited in the file of this patent

UNITED STATES PATENTS

| Number | Name | Date |
|---|---|---|
| 723,096 | Wert | Mar. 17, 1903 |
| 1,530,509 | Meyer | Mar. 24, 1925 |
| 1,577,732 | Lamb | Mar. 23, 1926 |
| 1,825,185 | Greenidge | Sept. 29, 1931 |
| 2,051,262 | MacClatchie | Aug. 18, 1936 |
| 2,181,748 | Thaheld | Nov. 28, 1939 |
| 2,295,678 | Miller | Sept. 15, 1942 |
| 2,517,307 | Harbison | Aug. 1, 1950 |